United States Patent [19]

Hattori et al.

[11] Patent Number: 5,017,660

[45] Date of Patent: May 21, 1991

[54] SELECTIVELY, PARTIALLY HYDROGENATED POLYMER AND RUBBER COMPOSITION AND IMPACT RESISTANT STYRENIC RESIN CONTAINING THE SAME

[75] Inventors: Yasuo Hattori; Yuichi Kitagawa, both of Yokohama, Japan

[73] Assignee: Asahi Kasei Kogyo kabushiki Kaisha, Osaka, Japan

[21] Appl. No.: 227,985

[22] Filed: Aug. 3, 1988

[30] Foreign Application Priority Data

Aug. 4, 1987 [JP] Japan ............................... 62-193793
Sep. 30, 1987 [JP] Japan ............................... 62-243626

[51] Int. Cl.$^5$ ........................ C08C 19/02; C08F 8/04; C08F 279/02; C08L 23/26
[52] U.S. Cl. .................................... 525/338; 525/314; 525/315; 524/576
[58] Field of Search ................. 524/576; 525/314, 315, 525/338

[56] References Cited

U.S. PATENT DOCUMENTS

| | | | |
|---|---|---|---|
| 3,769,256 | 10/1973 | Yoshimoto et al. | 524/493 |
| 3,798,190 | 3/1974 | Yoshimoto et al. | 525/237 |
| 3,848,026 | 11/1974 | Yoshimoto et al. | 525/237 |
| 3,993,855 | 11/1976 | Kang | 525/338 |
| 4,501,857 | 2/1985 | Kishimoto et al. | 525/338 |
| 4,673,714 | 6/1987 | Kishimoto et al. | 525/314 |

FOREIGN PATENT DOCUMENTS

| | | |
|---|---|---|
| 1924745 | 11/1969 | Fed. Rep. of Germany . |
| 2237491 | 2/1974 | Fed. Rep. of Germany . |
| 1576702 | 8/1969 | France . |
| 2275520 | 1/1976 | France . |
| 2539745 | 7/1984 | France . |
| 46-29020 | 8/1971 | Japan . |
| 46-35497 | 10/1971 | Japan . |
| 47-8928 | 3/1972 | Japan . |
| 52-41690 | 3/1977 | Japan . |
| 54-124047 | 9/1979 | Japan . |
| 59-133203 | 7/1984 | Japan . |
| 60-220147 | 11/1985 | Japan . |
| 62-55539 | 11/1987 | Japan . |

OTHER PUBLICATIONS

A. I. Yakubchik et al., "Effect of Hydrogenation on the Properties of Polybutadiene Rubbers", *Rubber Chemistry & Technology*, vol. XXXV, Oct.–Nov. 1962, No. 4, pp. 1052–1059.

*The Stereo Rubbers*, John Wiley & Sons, publishers, (1977), pp. 174–177.

*Primary Examiner*—Merrell C. Cashion, Jr.
*Assistant Examiner*—Carlos Azpuru
*Attorney, Agent, or Firm*—Birch, Stewart, Kolasch & Birch

[57] ABSTRACT

A selectively, partially hydrogenated butadiene polymer produced by selectively, partially hydrogenating a butadiene polymer comprising:

(1) a bound styrene content [S] of 0 to 40% by weight;
(2) a vinyl linkage content [V] of 1 to 80% at the butadiene portion;
(3) a weight average molecular weight (Mw) of 10,000 to 1,000,000; and
(4) a molecular weight distribution (Mw/Mn) of 1.2 to 5.0;

wherein the selectively, partially hydrogenated butadiene polymer produced is characterized by (5) a hydrogenation ratio [A] of 3 to 85% of the total butadiene portion; and
(6) a hydrogenation ratio [B] of 20% or more at the vinyl linkage moiety of the butadiene portion; and wherein the [A], [B], [S] and [V] satisfy the relationships of:

(7) $[A]/([S]+[V])^{\frac{1}{2}}$ which is 2 to 8; and
(8) $[B] \cdot [V]^{\frac{1}{2}}/[A]$ which is 10 to 16.

15 Claims, 2 Drawing Sheets

SELECTIVELY, PARTIALLY HYDROGENATED POLYMER AND RUBBER COMPOSITION AND IMPACT RESISTANT STYRENIC RESIN CONTAINING THE SAME

BACKGROUND OF THE INVENTION

1. Field of the Invention

The present invention relates to a selectively, partially hydrogenated polymer, and to a rubber composition and an impact resistant styrenic resin containing the same. More specifically, it relates to a selectively, partially hydrogenated butadiene polymer having a specific structure and a composition thereof comprising a butadiene polymer, e.g., a butadiene homopolymer or a styrene-butadiene copolymer having a specific structure which is partially and selectively hydrogenated, and to a rubber composition and an impact resistant styrenic resin containing the same.

2. Description of the Related Art

Polymers obtained by partial hydrogenation of styrene-butadiene copolymer have long been known, and it has been proposed to obtain a composition having an improved green strength by blending this polymer with other diene type elastomers or ethylene-propylene copolymer rubbers (JP-B-46-35497). Proposals have been also made for a composition having an excellent strength at break, and a rubbery elasticity, comprising this polymer and a specific inorganic filler (JP-B-47-8928), and for a method for producing an oil-extended rubber having an excellent heat-resistant aging characteristic and resilience (JP-B-46-29020) and the like.

Nevertheless, when the catalyst composed mainly of organic compounds of iron, nickel, cobalt of the prior art is used, it is difficult to partially hydrogenate the vinyl linkage by preferential selection, and to hydrogenate the vinyl linkage to a high extent, the 1,4-linkages including the cis-linkage and translinkage also must be hydrogenated to a high degree. This method also generated crystalline copolymers, and the intended improvement of resilience and heat-resistant aging characteristic resulted only in an undesirable marked increase in the hardness or a lowering of the exothermic property.

A method has been also proposed in which only the side chain portion of a diene polymer (i.e., vinyl linkage portion in butadiene polymer) is selectively hydrogenated, and a method is also known of obtaining a selectively hydrogenated diene polymer having an ozone resistance and an oxidation stability (JP-A-52-41690). But the polymer obtained according to this method, although showing a slightly improved heat-resistant aging characteristic or resilience, does not have a sufficient improvement of such characteristics, and no improvement at all of the hardness and elasticity modulus was observed.

As one of the many utilizations of unvulcanized rubber, the unvulcanized rubber is employed as a toughening agent for alleviating the brittleness of styrenic polymers such as polystyrene.

As the unvulcanized rubber used thereby, polybutadiene rubber and styrene-butadiene copolymer rubber are generally employed, and in particular, a low-cis polybutadiene rubber polymerized by using an organic lithium compound is used. Also, in some cases, a high-cis polybutadiene rubber polymerized by using a transition metal compound of, for example, cobalt, as the main component may be used. Nevertheless, the conventional impact resistant styrenic resins do not have a sufficient impact strength, and the development of resins having a greater impact resistance, and toughening agents therefore, are sought.

SUMMARY OF THE INVENTION

Accordingly, the objects of the present invention are to eliminate the above-mentioned problems of the prior art and to provide a novel polymer capable of solving the above-mentioned problems.

Other objects and advantages of the present invention will be apparent from the following description.

In accordance with the present invention, there is provided a selectively, partially hydrogenated butadiene polymer produced by selectively, partially hydrogenating a butadiene polymer comprising:

(1) a bound styrene content [S] of 0 to 40% by weight;

(2) a vinyl linkage content [V] of 1 to 80% at the butadiene portion;

(3) a weight average molecular weight (Mw) of 10,000 to 1,000,000; and (4) a molecular weight distribution (Mw/Mn) of 1.2 to 5.0;

wherein the selectively partially hydrogenated butadiene polymer produced is characterized by:

(5) a hydrogenation ratio [A] of 3 to 85% of the total butadiene portion;

(6) a hydrogenation ratio [B] of 20% or more at the vinyl linkage moiety of the butadiene portion; and wherein the [A], [B], [S] and [V] satisfy the relationships of:

(7) $[A]/([S]+[V])^{\frac{1}{2}}$ which is 2 to 8; and (8) $[B] \cdot [V]^{\frac{1}{2}}/[A]$ which is 10 to 16.

In accordance with the present invention, there is also provided a rubber composition suitable for use in tire manufacture, comprising 100 parts by weight of a starting material rubber containing at least 30% by weight of the above-mentioned selectively, partially hydrogenated butadiene polymer, 10 to 150 parts by weight of carbon black, and 0.1 to 10 parts of a vulcanizing agent.

In accordance with the present invention, there is further provided an impact resistant styrenic resin comprising a toughening agent, which comprises 2% to 25% by weight of the selectively, partially hydrogenated butadiene polymer defined above except that the butadiene polymer being partially hydrogenated comprises:

(1) a bound styrene content [S] of 0 to 40% by weight;

(2) a vinyl linkage content [V] of 1 to 80% at the butadiene portion;

(3) a weight average molecular weight (Mw) of 10,000 to 1,000,000; and (4) a molecular weight distribution (Mw/Mn) of 1.2 to 5.0; wherein the selectively partially hydrogenated butadiene polymer produced is characterized by (5) a hydrogenation ratio [A] of 3 to 85% of the total butadiene portion; and (6) a hydrogenation ratio [B] of 20% or more at the vinyl linkage moiety of the butadiene portion.

BRIEF DESCRIPTION OF THE DRAWING

The present invention will be better understood from the description set forth below with reference to the drawings, in which.

DESCRIPTION OF THE PREFERRED EMBODIMENTS

Figure 1:
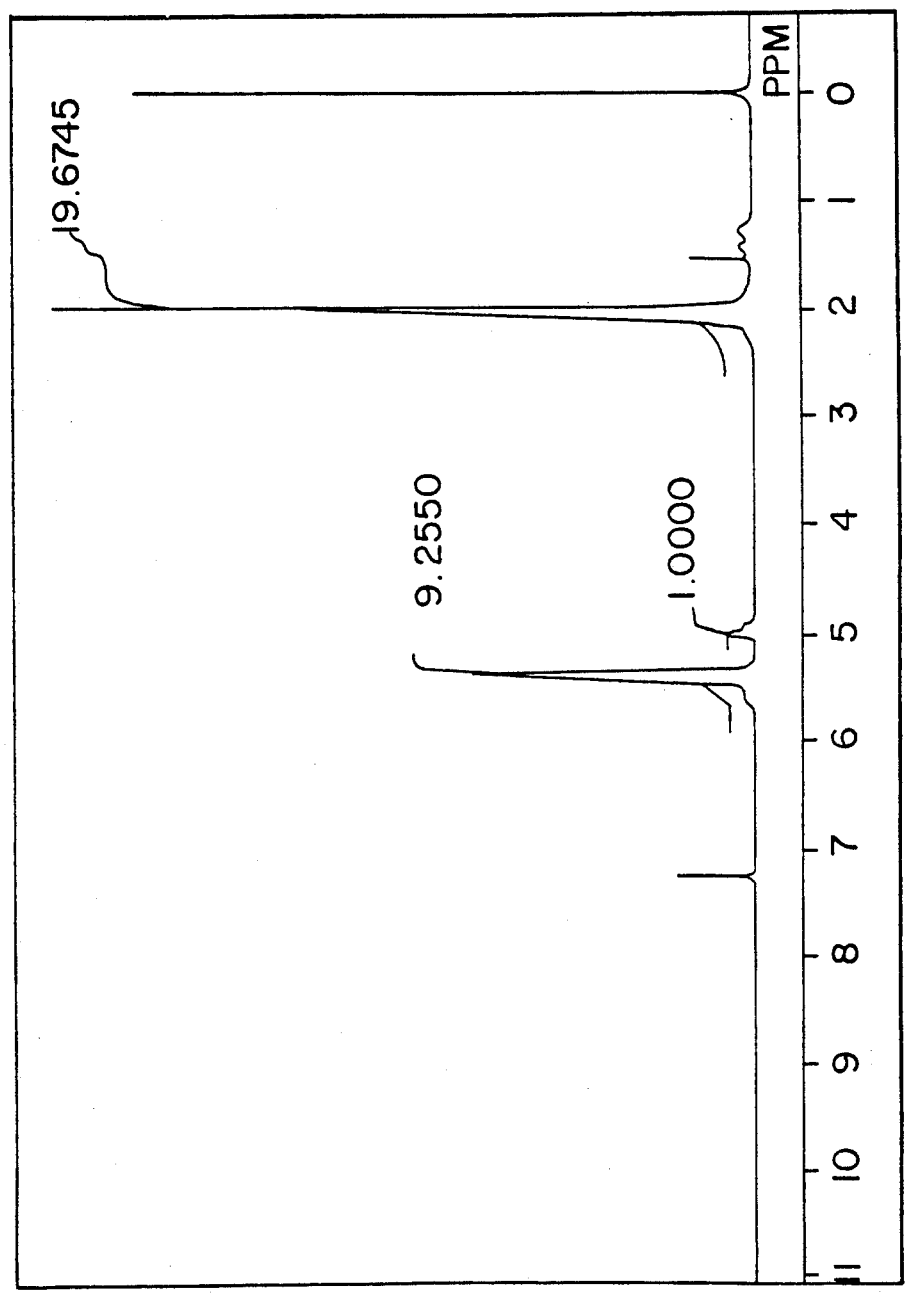
FIG. 1 is a diagram showing the FT-NMR absorption of the starting polymer in Example 1.
Figure 2:
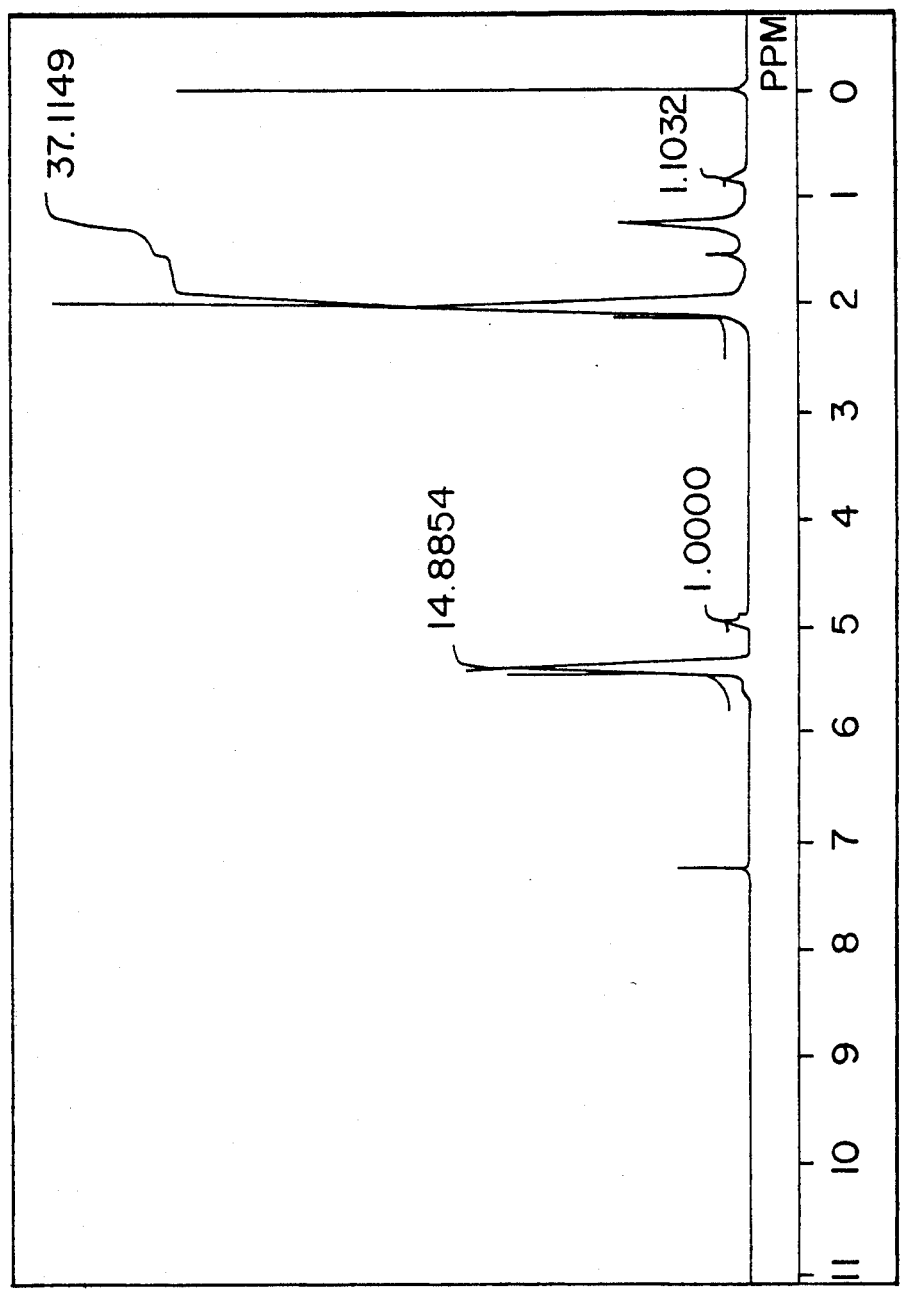
FIG. 2 is a diagram of the FT-NMR absorption of the polymer after a selective, partial hydrogenation in Example 1.

As the hydrogenation catalyst of butadiene polymers, styrene-butadiene copolymers, in addition to the organometallic compounds composed mainly of organic compounds of iron, nickel, cobalt, there are known catalysts comprising metals such as nickel, cobalt, platinum, palladium, and ruthenium supported on carriers such as carbon, silica, alumina, and diatomaceous earth.

These catalysts, however, have a lower activity and hydrogenation under lower temperature, but low pressure conditions therefor is practically impossible. Also, a selective partial hydrogenation did not occur from the vinyl linkage of the butadiene portion. Recently, a highly active hydrogenation method using an organometallic compound of titanium was disclosed (JA-A-59-133203 and 60-220147), and it has become possible to easily hydrogenate only the butadiene portion under the mild conditions of a low temperature and low pressure on an industrial scale. The present invention has applied this method to a partial hydrogenation of a butadiene polymer or a styrene-butadiene polymer with a specific structure, to obtain a selectively partially hydrogenated polymer with a specific structure, to thereby solve the problems of the prior art.

The butadiene polymer, e.g., a butadiene homopolymer or a styrene-butadiene copolymer which is the starting polymer of the selectively partially hydrogenated butadiene polymer must have a specific structure. Namely, said starting polymer must have a structure comprising:

(1) a bound styrene content [S] of 0 to 40% by weight;

(2) a vinyl linkage content [V] of 1 to 80% at the butadiene portion; and (3) a weight average molecular weight (Mw) of 10,000 to 1,000,000; and (4) a molecular weight distribution (Mw/Mn) of 1.2 to 5.0. If the bound styrene content exceeds 40% by weight, even if the other conditions of the present invention are satisfied, a sufficient improvement of the resilience and exothermic property cannot be obtained. The bound styrene content is preferably limited to 30% or less, and preferably, the styrene is bound at random. The vinyl linkage content at the butadiene portion is limited to 1 to 80%. Outside of this range, vinyl linkage content is too high or too low, and therefore, the selective, partial hydrogenation of vinyl linkages of the present invention cannot be obtained and thus the required effect will not be exhibited. The vinyl linkage content is preferably to 5 to 60%, more preferably 10 to 50%. The weight average molecular weight (Mw) must be 10,000 to 1,000,000 and the molecular weight distribution as represented by Mw/Mn must be 1.2 to 5.0. If the molecular weight is less than 10,000 or the molecular weight distribution exceeds 5, the physical properties of the starting polymer to be improved, namely the hardness, modulus or resilience, and exothermic property will be remarkably inferior, and a satisfactory polymer cannot be obtained even by the present invention. On the other hand, if the molecular weight exceeds 1,000,000 or the molecular weight distribution is less than 1.2, processing of the polymer as a rubber or production thereof becomes difficult, and the present application cannot be applied. Preferably, the molecular weight is 50,000 to 800,000, more preferably 100,000 to 600,000, and the molecular weight distribution is preferably 1.5 to 3.0. The molecular weight and the molecular weight distribution are measured in a conventional manner by gel permeation chromatography.

A part of the butadiene component of the butadiene polymer and styrene-butadiene copolymer having the specific structure as described above may be replaced with other conjugated diene components copolymerizable therewith, within the range of not more than 30% by weight. Examples of such other conjugated diene components include isoprene, 2,3-dimethyl-1,3-butadiene, 1,3-pentadiene, and the like. The same also holds true for the styrene component, and a part of the styrene component may be replaced with vinyl-substituted aromatic hydrocarbons such as t-butylstyrene, α-methylstyrene, p-methylstyrene, and divinylbenzene.

The butadiene polymer, styrene-butadiene copolymer having the specific structure which is the starting polymer for the selectively, partially hydrogenated butadiene polymer of the present invention may be produced by any preparation method, provided that the structure obtained corresponds to the limited structure specified above. Representative preparation methods for obtaining these polymers are described below. Namely, the starting polymer can be obtained by homopolymerization of monomeric butadiene or copolymerization with a predetermined ratio of styrene in an inert solvent such as hexane, cyclohexane, or benzene, by using an organic lithium such as nbutyllithium, sec-butyllithium, or other alkali metal compounds as the polymerization catalyst, optionally together with an organic compound, typically an alkoxide such as potassium butoxide, organic acid salts such as dodecylbenzenesulfonate or sodium stearate, and further optionally, a polar organic compound used as the compound for controlling the vinyl linkage content, such as ether, polyether, tertiary amine, polyamine, thioether, and hexamethylphosphortriamide. The vinyl linkage content can be controlled by the amount added of the above polar organic compound, and by the polymerization temperature.

By coupling the polymeric chains having active terminal ends obtained according to the above-mentioned method with a polyfunctional compound such as silicon tetrachloride, tin tetrachloride, a polyepoxy compound, etc., or adding a branching agent such as divinylbenzene to the polymerization system, a branched or radial polymer or copolymer can be obtained. Further, in the above polymerization method, by controlling the method of addition of the monomer, or varying the polymerization conditions during the polymerization reaction, such as the amount of compound for controlling the vinyl linkage content, the addition method thereof, and the polymerization temperature, it is possible to form a polymer or a copolymer in which the styrene content or the vinyl linkage content can be increased or decreased, or formed into a block shape in the molecular chain as described above.

During polymerization, various compounds such as acetylene, 1,2-butadiene, fluorene, primary amine, and secondary amine, etc. also can be used as the molecular weight controller.

As the polymerization process for obtaining the above polymer, the batch or continuous process, or a combination thereof, may be used.

The starting polymer of the present invention can be also prepared according to a polymerization method other than that employing a lithium catalyst; for example, a method employing a Ziegler type catalyst comprising an organic compound of nickel, cobalt, titanium, and an organometallic component of lithium, magnesium, aluminum, or an emulsion polymerization method.

The polymer of the present invention comprises the specific butadiene polymer e.g., a butadiene homopolymer or a styrene-butadiene copolymer as described above, which is selectively partially hydrogenated, and is characterized by (5) a hydrogenation ratio [A] of 3 to 85% of the total butadiene portion;

(6) a hydrogenation ratio [B] of 20% or more at the vinyl linkage moiety of the butadiene portion.

The hydrogenation ratio [A] of the total butadiene portion is 3 to 85%, preferably 3 to 60%, and more preferably 5 to 50% or 8 to 40%, particularly preferably in the range of 10 to 30%. At a hydrogenation ratio lower than this range, a polymer having the high hardness, modulus and excellent resilience of the present invention cannot be obtained.

On the contrary, at too high a hydrogenation ratio A, the polymer has a partial crystallinity, giving physical properties of a too high hardness and an inferior exothermic property. The hydrogenation ratio [B] at a vinyl linkage moiety of the butadiene portion is 20% or more, preferably 30% or more, more preferably 45 to 95%, most preferably 60 to 90%. At a hydrogenation ratio [B] lower than this range, the improvement of the heat-resistant aging characteristic and resilience is small.

Especially when the present polymer is used in a rubber composition, the range of the hydrogenation ratio [A] of the whole butadiene portion is determined as a function of the bound styrene content [S] of the butadiene polymer, e.g., the butadiene homopolymer or the styrene-butadiene copolymer, and the bound vinyl linkage content [V] of the butadiene portion.

(7) $[A]/([S]+[V])^{\frac{1}{2}}$ is preferably 2 to 8, more preferably 3 to 7, most preferably 4 to 6. If this value is less than 2, the effect of the present invention, particularly the elevation of the hardness and modulus, will not be exhibited, and conversely, if this value is higher than 8, the exothermic property will be lowered. The hydrogenation ratio [B] at the vinyl linkage portion of the butadiene portion is determined as a function of the vinyl linkage content [V] of the butadiene portion of the starting polymer and the hydrogenation ratio [A] of the whole butadiene portion.

(8) $[B] \cdot [V]^{\frac{1}{2}}/[A]$ is preferably limited to 10 to 16, more preferably 11 to 15, most preferably 12 to 14. Outside of this range, the excellent hardness and modulus, exothermic property, resilience and heat-resistant aging characteristic, which are the desired effects of the present invention, cannot be imparted to the polymer. If this numerical value exceeds 16, although there may be an improvement of other physical properties, the physical properties as a whole will become undesirably unbalanced with respect to an elevation of the hardness and modulus or heat-resistant aging characteristic. On the contrary, at a value lower than 10, the physical properties do not have a satisfactory resilience and exothermic property, resulting in unbalanced physical properties.

On the other hand, when the present selectively, partially hydrogenated butadiene polymer is used as a toughening agent for improving the impact strength of styrenic resins, the polymer should have the abovementioned requirements (1) to (6). Especially, the desired effects, e.g., the remarkable increase in the impact resistance can be obtained when the vinyl linkage content after hydrogenation is preferably within the range of 0.5 to 12%, and when the 1,4-linkage content after hydrogenation is preferably at least 10%. The 1,2-vinyl linkage content after hydrogenation is preferably 1 to 10%, more preferably 2 to 7%.

When the 1,2-vinyl linkage content after hydrogenation is less than 0.5%, e.g., zero or very small, it is likely to become difficult to crosslink the rubber phase when producing an impact resistant styrenic resin, and only a resin having an inferior impact resistance is obtained, unless a special treatment is conducted. On the other hand, when more than 12%, the impact resistance of the obtained resin is likely to become inferior.

Also, when the 1,4-linkage content after hydrogenation is less than 10%, it is likely to become difficult to crosslink the rubber phase when producing the impact resistant styrenic resin, whereby a resin having a relatively inferior impact resistance can be obtained.

The partially hydrogenated conjugated diene type rubber after partial hydrogenation preferably has a Mooney viscosity measured at 100° C., ($ML_{1+4}$, 100° C.) of 20 to 90, and a solution viscosity in 5% by weight of styrene (5% SV) at 25° C. of 25 to 150 centipoise, when used in the above-mentioned impact resistant styrenic resin.

As long as the selectively, partially hydrogenated butadiene polymer satisfies the above-mentioned requirements, any catalysts and any production methods may be utilized. The hydrogenation catalyst suitably used in the present invention may include an organometallic compound containing titanium as the metal component alone or a catalyst comprising a combination thereof with an organometallic compound of lithium, magnesium, aluminum, and specific examples thereof are disclosed in JA-A-59-133203 and 60-220147. The selective partial hydrogenation of the present invention must be practiced under extremely mild reaction conditions by using the above catalyst. More specifically, the partial hydrogen pressure in the reaction system must be 10 kg/cm² or less, preferably 6 kg/cm² or less, more preferably 3 kg/cm² or less. The reaction is preferably carried out at a temperature of 0 to 100° C., more preferably 20 to 80° C., most preferably 40 to 60° C. Under hydrogenation conditions outside of this range, a selectively, partially hydrogenated butadiene polymer having the specific structure of the present invention cannot be obtained. The hydrogenation reaction is practiced in the presence of a solvent which is inert to the catalyst and can dissolve the starting polymer. Suitable solvents may include aliphatic hydrocarbons such as n-pentane, n-hexane, and n-octane, alicyclic hydrocarbons such as cyclohexane, and cycloheptane, and ethers such as diethyl ether and tetrahydrofuran, alone or as mixtures composed mainly of such solvents.

The hydrogenation reaction of the present invention may be practiced by maintaining the above-mentioned starting polymer at a predetermined temperature under a hydrogen or inert atmosphere, adding a hydrogenation catalyst while stirring or not-stirring, and subsequently, pressurizing the system to a predetermined pressure by an introduction of hydrogen gas. An inert atmosphere means an atmosphere which is not reactive with any reactant in the hydrogenation reaction, such as helium, neon, and argon, etc. Air or oxygen is not preferable, as this will cause a deactivation of the catalyst through an oxidation of the catalyst components. Also, nitrogen acts as a catalyst poison during the hydrogenation reaction, and lowers the hydrogenation activity. Particularly, most preferably the atmosphere within the hydrogenation reactor should consist of hydrogen gas alone.

When a titanocene diaryl compound is used as the hydrogenation catalyst, it may be added as is to the reaction mixture, or alternatively, as a solution in an inert organic solvent. The inert organic solvent to be used when the catalyst is used as a solution may be any of the above various solvents which are not reactive with any reactant in the hydrogenation reaction. Preferably, it is the same solvent as the solvent used in the hydrogenation reaction. The amount of the catalyst added may be 0.02 to 20 mmols per 100 g of the starting polymer.

The most preferable method for obtaining the polymer of the present invention comprises solution-polymerizing the starting polymer by using an organic lithium catalyst, and using the polymer solution obtained for the subsequent hydrogenation reaction. This method is extremely useful in commercial application.

The selectively, partially hydrogenated polymer of the present invention is obtained by evaporating the solution obtained above to dryness.

The polymer according to the present invention, by making use of the characteristics thereof, can be widely used for uses for which butadiene polymers, e.g., the butadiene homopolymers and the styrene-butadiene copolymers are presently used. A particularly preferable use is for automobile tire manufacture, and the polymer of the present invention, either alone or as a blend with natural rubber or other synthetic rubbers, can be provided for final use via predetermined "formulation", "molding", and "vulcanization" processes. In this case, to enable the effect of the polymer of the present invention to be exhibited, the starting rubber must comprise at least 30% of the polymer of the present invention. Examples of synthetic rubbers available in the blend may include butadiene polymer, butadiene homopolymer, styrene-butadiene copolymer, isoprenebutadiene copolymer, acrylonitrile-butadiene copolymer, chloroprene polymer, ethylene-propylene copolymer, isoprene-isobutylene copolymer etc. As the formulating agents to be added to the above starting material rubber, and as the formulating agent to be added to the above rubber composition, there may be included reinforcing agents, softening agents, fillers, vulcanization agents, vulcanization accelerators, vulcanization aids, colorants, flame retardants, lubricants, blowing agents, and other formulating agents, which may be suitably selected and used depending on the intended use of the composition.

Typical reinforcing agents are carbon blacks, and various kinds of carbon blacks with different particle sizes or structures obtained by various preparation methods can be used, preferably carbon blacks such as ISAF, HAF, FEF, etc. The amount of carbon black added may be used in view of the amount of the process oil added simultaneously, but may be 10 to 150 parts by weight, preferably 40 to 100 parts by weight based on 100 parts by weight of the starting rubber. The kind and amount of the above carbon black may be suitably controlled depending on the purpose of use of the rubber composition, and two or more kinds also may be used in combination.

As other reinforcing agents added optionally, inorganic reinforcing agents such as silica, activated calcium carbonate, etc. or high-styrene resin, phenolformaldehyde resin, etc., may be employed, and these inorganic or organic reinforcing agents may be employed in amounts of 1 to 100 parts, preferably 5 to 50 parts by weight, based on 100 parts by weight of the starting rubber.

Typical softening agents optionally added are process oils, and various kinds including paraffinic, naphthenic, and aromatic oils can be suitably used in the rubber composition, in amounts of 2 to 100 parts by weight, preferably 5 to 70 parts by weight, based on 100 parts by weight of the starting material rubber. Also, an oil-extended polymer in which a process oil is previously added to the starting material rubber can be used. As other softening agents, fluid paraffin, coal tar, fatty oil, rubber substitute (or factice), and the like can be used.

Examples of the fillers may include calcium carbonate, clay, talc, aluminum hydroxide and the like.

A typical vulcanizing agent is sulfur, which may be used in an amount of 0.1 to 10 parts by weight, preferably 0.2 to 5 parts by weight, based on 100 parts by weight of the starting material rubber. Other vulcanization agents may include sulfur compounds such as sulfur chloride, morpholine-disulfide, alkylphenol disulfide, peroxides, etc., and these can be used either individually or in combination with sulfur.

A variety of compounds are included as vulcanization accelerators, and are used in amounts of 0.01 to 5 parts by weight, per 100 parts by weight of the starting material rubber, and sometimes in combination of two or more kinds thereof Representative vulcanization accelerators may include guanidine type, aldehyde-amine and aldehyde-ammonia type, thiazole type, imidazoline type, thiourea type, thiuram type, dithiocarbamate type, xanthate type accelerators, and mixed accelerators.

The vulcanization aids may be exemplified by metal oxides such as zinc oxide, etc., fatty acid compounds such as stearic acid, etc., amines and others, and may be employed in amounts of 0.1 to 10 parts by weight based on 100 parts by weight of the starting rubber.

Typical examples of the antioxidant agents are amine type, phenol type, phosphorous type, and sulfur type compounds, and may be added in amounts of 0.001 to 10 parts by weight, based on 100 parts by weight of the starting material rubber, sometimes in combination of two or more kinds.

As the typical scorch preventive, there may be included phthalic anhydride, salicylic acid, N-nitrosodiphenylamine.

As the tackifier, there may be included coumaroneindene resin, terpene-phenol resin, rosin ester, and the like.

Further, if necessary, various formulating agents can be used.

The rubber composition of the present invention can be obtained by mixing the starting material rubber with various formulating agents by various kinds of mixing devices generally employed for mixing rubber compositions, such as open rolls, a Banbury mixer, a kneader, and an extruder, and subsequently molded into a desired shape followed by vulcanization.

The polymer and the rubber composition of the present invention may be suitably used by utilizing the specific features thereof for various uses, such as tires for automobiles, industrial articles such as belts, hoses and anti-vibration rubbers; footwear; articles for daily use; construction materials; and other uses.

According to the present invention, the impact resistant styrenic resins can be provided by using the above-mentioned selectively partially hydrogenated butadiene polymer. The impact resistant styrenic resin of the present invention is a styrenic resin containing 2 to 25% by weight, preferably 5 to 20% by weight, more preferably 8 to 15% by weight of the selectively, partially hydrogenated butadiene polymer as described above. When the amount of polymer used is less than this range, the improvement of the impact resistance intended by the present invention is unsatisfactory, and if used in an amount more than this range, although the impact resistance can be improved, the characteristics inherently possessed by a styrenic resin, for example, tensile strength, rigidity, and further, the appearance such as glossiness will be undesirably lost. Also, in the present invention, other than the selectively, partially hydrogenated butadiene polymer, other known unvulcanized rubbers known to be used as the toughening agent may be contained in a small amount, for example, 1 to 10% by weight. In this case, for the effect of the present invention to be exhibited, at least 30% of the toughening agent used must be the polymer of the present invention. A preferable method for obtaining the impact resistant styrenic resin of the present invention is that in which 2 to 25% by weight of a partially, hydrogenated conjugated polymer and 98 to 75% by weight of a styrenic monomer or a mixture thereof with an unsaturated compound copolymerizable with the styrenic monomer are subjected to radical polymerization by mass polymerization, combined mass and suspension polymerization or solution polymerization.

The styrenic monomer usable in the present invention may include styrene, α-methylstyrene, vinyltoluene such as p-methylstyrene, vinylethylbenzene, vinylxylene, vinylnaphthalene and the like, and can be used either alone or as a mixture of two or more kinds thereof. Examples of unsaturated compounds copolymerizable with styrenic monomer may include acrylonitrile, methyl methacrylate, and others. The styrenic monomer particularly preferable in the present invention is styrene, and this alone, or a mixture thereof with other monomers containing 50% by weight or more of styrene, may be used.

Mass polymerization, which is one of the preferably methods for obtaining the impact resistant styrenic resin of the present invention, may be generally practiced as follows. First, the partially hydrogenated polymer specified in the present invention is subjected to heat polymerization at a polymerization temperature of 50 to 250° C. when a radical initiator is not used as the catalyst. When a radical initiator is used as the catalyst, polymerization is conducted at 20 to 200° C. corresponding to the decomposition temperature of the radical initiator at a stirring speed of 10 to 20 rpm, and the polymerization operation is continued until the conversion of styrene becomes as desired. During the mass polymerization, frequently a known internal lubricant, for example, liquid paraffin, is used in an amount of 0.1 to 5 parts by weight based on 100 parts by weight of the polymer. After completion of polymerization, when a small amount, generally 30% by weight or less, of unreacted styrene is contained in the polymer formed, this styrene is preferably removed under a reduced pressure under heating or by an extruder designed for removing volatiles. Stirring during such mass polymerization may be conducted, if necessary, but stirring is preferably stopped or made at a slower speed after conversion of the styrene to a polymer; namely, the polymerization rate of styrene has become 30% or more. Excessive stirring may sometimes lower the strength of the polymer obtained. If necessary, polymerization may be carried out in the presence of a small amount of a diluent such as toluene, ethylbenzene, and these diluents may be removed by heating together with unreacted styrene after completion of the polymerization.

Also, the combined mass and suspension polymerization is useful for production of the impact resistant styrenic resin. In this method the first half of the reaction is carried out in a mass state, and the second half of the reaction is carried out in a suspended state. More specifically, the styrenic solution of the specific partially hydrogenated conjugated diene type rubber is subjected to heating polymerization in the absence of a catalyst or catalyzed polymerization, as in the case of mass polymerization as described above, or irradiation polymerization, to polymerize partially, generally 50% or less, especially preferably 10 to 40% of styrene. This is the first half of the reaction by mass polymerization. Subsequently, the partially polymerized mixture is dispersed under stirring into an aqueous solvent in the presence of a suspension stabilizer and/or a surfactant, to complete the second half of the reaction by suspension polymerization, followed by washing, drying, and if necessary, pelletizing or pulverizing, to provide the product for practical application.

The impact resistant styrenic resin according to the present invention thus obtained consists of a rigid phase of a styrenic polymer and soft components; namely, the partially hydrogenated polymer having styrene grafted thereon and dispersed particles of styrenic polymer occluded therein (rubber particles). In such an impact resistant styrenic resin, the gel content (i.e., content of toluene insolubles) is preferably in the range of 8 to 40% by weight, and the swelling index of the gel in the resin in toluene is preferably in the range of 7 to 15. Further, the molecular weight of the resin portion is preferably in the range of 100,000 in terms of weight average molecular weight, more preferably 180,000 to 280,000. The amount of styrenic oligomers remaining in the resin has an influence on the heat resistance, and therefore, is usually preferably 1% by weight or less, particularly 0.5% by weight when a heat resistance is demanded. The partially hydrogenated polymer particle size is preferably 0.2 to 5.0 μm, and more preferably 0.2 to 1.5 μm when glossiness is required.

Further, the impact resistant styrenic resin of the present invention can be applied with a flame retardant recipe by formulating a halogenic flame retardant and a flame retardant aid such as $Sb_2O_3$, if necessary, and further, can be used by mixing with antioxidants, UV-ray absorbers, lubricants, mold release agents, colorants, various fillers and various thermoplastic resins, such as general purpose polystyrene, methacrylic resin, vinyl chloride resin, styrene-butadiene block copolymer resin, polyacetal, polyphenylene ether resin, polycarbonate, nylon resin, polyethylene terephthalate, polybutylene terephthalate, styrene-methacrylate copolymer resin, styrene-maleic anhydride copolymer resin, acid-modified polyolefin, and an ionomer.

The impact resistant styrenic resin of the present invention can be formed into articles according to general processing methods such as injection molding and extrusion molding.

As described above and explained below, with the selectively, partially hydrogenated polymer having the specific structure of the present invention, a starting material rubber having well-balanced physical properties, with a high hardness and modulus, excellent resilience and exothermic property, and an excellent heat-resistant aging characteristics, is provided. The carbon-formulated composition of the starting material rubber of this polymer alone, or obtained by blending with another rubber, is also suitable for tires, particularly tire treads.

The impact resistant styrenic resin according to the present invention obtained as described above has a far superior impact resistance and a higher rigidity, compared with the unvulcanized rubber of the prior art, as shown in the following Examples. Thus, the impact resistant styrenic resin of the present invention has an excellent impact resistance and rigidity, and therefore, can be used for a diversity of articles, including VTR cassettes, and cabinets or housings for electrical articles.

EXAMPLES

The present invention will now be further illustrated by, but is by no means limited to, the following Examples and Comparative Examples.

EXAMPLE 1 AND COMPARATIVE EXAMPLE 3

Using an autoclave of 10 liter inner volume equipped with a stirrer and a jacket as the reactor, a butadiene/n-hexane mixture (butadiene concentration 20% by weight) is introduced at a rate of 20 liter/hr. and a n-butyllithium/n-hexane solution (concentration 5% by weight) at a rate of 60 ml/hr., and a continuous polymerization of the butadiene is carried out at a polymerization temperature of 110° C. The active polymer obtained is deactivated with methanol, and 8 liters of the polymer solution is transferred to another reactor having a 10 liters inner volume equipped with a stirrer and a jacket. At a temperature of 60° C., a mixture of 250 ml of di-p-tolylbis(1-cyclopentadietnyl)titanium/cyclohexane solution (concentration 1 mmol/liter) and 50 ml of n-butyllithium solution (concentration 5 mmol/liter) mixed at 0° C. under a hydrogen pressure of 2.0 kg/cm$^2$ is added, and the reaction is carried out under a partial hydrogen pressure of 2.5 kg/cm$^2$ for 30 minutes. The selectively, partially hydrogenated polymer solution obtained is added with 0.5 parts by weight of 2.6-di-tert-butylhyiroxy-toluene as an antioxidant, followed by removal of the solvent. The analytical values of the starting polymer obtained by sampling after methanol deactivation (the butadiene polymer of Comparative Example 3) and the analytical values of the selectively, partially hydrogenated polymer are shown in Table 1.

Also, the vulcanized physical properties of carbon-formulated composition of the 75/25 blend of this product with natural rubber are shown in Table 2.

EXAMPLES 2-8 AND COMPARATIVE EXAMPLES 1, 2, 4 -11

Butadiene polymers and styrene-butadiene polymers obtained by batch polymerization or continuous polymerization by using organic lithium catalysts (alone or together with tetrahydrofuran as the modifier) are hydrogenated by varying the reaction conditions (hydrogenation pressure, hydrogenation temperature, time and catalyst amount) to obtain the selectively hydrogenated polymers of Examples 2 to 8 and Comparative Examples 1, 2, 4-9. In comparative Example 10 and 11, the hydrogenation is effected using a nickel catalyst disclosed in JP-B-46-35497. Furthermore, in Comparative Example 6, the starting polymer used in Example 6 is used without hydrogenation. The structural analytical values of the respective polymers are shown in Table 1. Also, the vulcanized physical properties of the carbonformulated compositions of these polymers alone or after blending with natural rubber are shown in Table 2 and Table 3.

TABLE 1

|  | *1 Bound styrene content [S] (wt %) | *2 Vinyl linkage content [V] (wt %) | *3 Weight average molecular weight (Mw × 10$^4$) | *4 Molecular weight distribution (Mw/Mn) | *5 Hydrogenation ratio of whole butadiene portion [A] (%) | *6 Hydrogenation ratio of vinyl-linkage moiety [B] | [A]/[B] · ([S] + [V])$^{\frac{1}{2}}$ | [V]$^{\frac{1}{2}}$/[A] |
|---|---|---|---|---|---|---|---|---|
| Example 1 | 0 | 11 | 23 | 2.1 | 9 | 42 | 2.7 | 15.4 |
| Example 2 | 0 | 11 | 23 | 2.1 | 18 | 81 | 5.6 | 14.8 |
| Example 3 | 0 | 45 | 38 | 1.6 | 40 | 75 | 4.5 | 12.6 |
| Example 4 | 0 | 22 | 27 | 2.5 | 28 | 88 | 5.9 | 14.7 |
| Comparative Example 1 | 0 | 11 | 23 | 2.1 | 7 | 35 | 2.0 | 17.3 |
| Comparative Example 2 | 0 | 12 | 18 | 1.5 | 5 | 20 | 1.4 | 13.8 |
| Comparative Example 3 | 0 | 11 | 23 | 2.1 | 0 | 0 | — | — |
| Example 5 | 18 | 14 | 24 | 2.3 | 25 | 85 | 3.1 | 12.7 |
| Example 6 | 18 | 32 | 33 | 2.4 | 35 | 70 | 4.9 | 11.3 |
| Example 7 | 15 | 45 | 18 | 1.8 | 25 | 55 | 3.2 | 14.7 |
| Example 8 | 28 | 32 | 45 | 2.3 | 27 | 55 | 3.5 | 11.5 |
| Comparative Example 4 | 18 | 12 | 26 | 2.7 | 40 | 75 | 7.3 | 6.5 |
| Comparative Example 5 | 15 | 45 | 18 | 1.8 | 70 | 95 | 9.0 | 9.0 |
| Comparative Example 6 | 18 | 32 | 33 | 2.4 | 0 | 0 | — | — |
| Comparative Example 7 | 0 | 25 | 24 | 2.2 | 55 | 100 | 11.0 | 9.1 |

TABLE 1-continued

| | | | | | | | | |
|---|---|---|---|---|---|---|---|---|
| Comparative Example 8 | 15 | 12 | 23 | 2.1 | 45 | 100 | 8.6 | 11.5 |
| Comparative Example 9 | 25 | 65 | 25 | 2.4 | 18 | 26 | 1.9 | 13.7 |
| Comparative Example 10 | 0 | 12 | 22 | 2.0 | 25 | 28 | 7.2 | 3.9 |
| Comparative Example 11 | 15 | 35 | 21 | 2.0 | 30 | 42 | 4.2 | 9.9 |

*1: The starting polymer is formed into a chloroform solution, and the bound styrene content (% by weight) is measured from the absorption at UV 254 nm due to the phenyl nucleus of styrene.

*2: The starting polymer is formed into a chloroform solution, and from the integrated intensities of the 1,2-vinyl proton ($=CH_2$) at the chemical shift 4.7 ppm of 5.2 ppm (defined as the signal $C_0$) and the vinyl proton ($=CH-$) at the chemical shift 5.2 ppm to 5.8 ppm, measured by FT-NMR (270 mega, produced by Nippon Denshi), calculation is conducted according to the following formula:

$$V = \left[ \frac{C_0}{2} \bigg/ \left( \frac{C_0}{2} + \frac{1}{2}\left(D_0 - \frac{C_0}{2}\right) \right) \right] \times 100$$

*3 and *4: The polymer is formed into a tetrahydrofuran (THF) solution, measurement is conducted by GPC Columns of LC-5A column PS gels $10^4$ GPC, $10^5$ and $10^6$ produced by Shimazu Seisakusho are connected in series to one another, and a differential diffractometer is used as the detector), and the average molecular weight is calculated by using the calibration curve previously determined from the relationship between the molecular weights of the peaks of standard polystyrenes and the GPC count number.

*5 and *6: The starting polymer is formed into a deutro-chloroform solution, integrated intensities of the 1,2-vinyl proton ($=CH_2$) at the chemical shift 4.7 ppm to 5.2 ppm (defined as the signal $C_0$) and the vinyl proton ($=CH-$) at the chemical shift 5.2 ppm to 5.8 ppm (defined as the signal $D_0$) are determined by FT-NMR (270 mega, produced by Nippon Denshi, further the selectively partially hydrogenated polymer is formed into a deutero-chloroform solution, and similarly, a calculation is conducted according to the formulae shown below from the integrated intensities of the methyl proton of the hydrogenated 1,2-bond ($-CH_3$) at the chemical shift 0.6 ppm to 1.0 ppm (defined as the signal $A_1$), the proton of 1,2-vinyl not hydrogenated at the chemical shift of 4.7 ppm to 5.2 ppm (defined as the signal $C_1$ and the vinyl proton not hydrogenated ($=CH-$) at the chemical shift 5.2 ppm to 5.8 ppm (defined as the signal $D_1$), measured similarly by FT-NMR:

First, with $p = \dfrac{C_0}{2} \bigg/ \left( \dfrac{C_1}{2} + \dfrac{A_1}{3} \right)$ $A_{11} = pA_1$
$C_{11} = pC_1$
$D_{11} = pD_1$

*6: hydrogenation ratio of 1,2-vinyl linkage portion $$[B] = \left( \frac{A_{11}}{3} \bigg/ \left( \frac{A_{11}}{3} + \frac{C_{11}}{2} \right) \right) \times 100$$

$$[C] = \left( \left( \frac{1}{2}\left(D_0 - \frac{C_0}{2}\right) - \frac{1}{2}\left(D_{11} - \frac{C_{11}}{2}\right) \right) \bigg/ \frac{1}{2}\left(D_0 - \frac{C_0}{2}\right) \right) \times 100$$

*5: hydrogenation ratio of whole butadiene portion $$[A] = \frac{[V]}{100} \times [B] + \frac{100 - [V]}{100} \times [C]$$

TABLE 2

| | Hardness*7 JIS | 300% Modulus*8 (kg/cm²) | Tensile strength*9 (kg/cm²) | Elongation*10 (%) | Resilience*11 70° C. (%) | Exothermic property*12 Δ H (°C.) | Heat-resistant aging characteristic strength retentivity*13 |
|---|---|---|---|---|---|---|---|
| Example 1 | 66 | 135 | 215 | 420 | 65 | 45 | |
| Example 2 | 68 | 175 | 224 | 380 | 68 | 42 | |
| Example 3 | 70 | 133 | 210 | 400 | 68 | 32 | |
| Example 4 | 69 | 145 | 226 | 410 | 68 | 35 | |
| Comparative Example 1 | 65 | 128 | 212 | 420 | 64 | 50 | Δ |
| Comparative Example 2 | 65 | 122 | 212 | 400 | 63 | 48 | X |
| Comparative Example 3 | 65 | 126 | 208 | 420 | 62 | 53 | X |

| Formulation | |
|---|---|
| Selectively partially hydrogenated polymer (Example 1–4, Comparative Example 1, 2) or starting polymer | 75 wt. parts |
| Natural rubber | 25 wt. parts |

TABLE 2-continued

| | |
|---|---|
| Carbon (N-339) | 50 wt. parts |
| Stearic acid | 2 wt. parts |
| Zinc white | 3 wt. parts |
| Antioxidant (810N) | 1 wt. parts |
| Sulfur | 1.75 wt. parts |
| Accelerator NS | 1 wt. parts |
| Oil (aroma) | 5 wt. parts |

TABLE 3

| | Hardness JIS*7 | 300% Modulus*8 (kg/cm²) | Tensile strength*9 (kg/cm²) | Elongation*10 (%) | Resilience*11 70° C. (%) | Exothermic property*12 Δ H (°C.) | Heat-resistant aging characteristic strength retentivity*13 | Wet skid resistance*14 |
|---|---|---|---|---|---|---|---|---|
| Example 5 | 67 | 140 | 220 | 420 | 63 | 30 | | 67 |
| Example 6 | 66 | 123 | 208 | 420 | 62 | 29 | | 70 |
| Example 7 | 63 | 105 | 188 | 450 | 60 | 28 | | 75 |
| Example 8 | 66 | 118 | 215 | 490 | 57 | 30.5 | | 80 |
| Comparative Example 4 | 75 | 172 | 210 | 380 | 55 | 47 | | 63 |
| Comparative Example 5 | 80 | 164 | 175 | 350 | 54 | >50 (Blow out) | | 60 |
| Comparative Example 6 | 62 | 103 | 191 | 420 | 55 | 42 | X | 64 |
| Comparative Example 7 | 70 | 123 | 164 | 400 | 56 | >50 (Blow out) | | 54 |
| Comparative Example 8 | 68 | 147 | 200 | 420 | 54 | 44 | | 60 |
| Comparative Example 9 | 63 | 88 | 210 | 480 | 46 | 40 | X | 70 |
| Comparative Example 10 | 67 | 124 | 147 | 355 | 55 | 38 | X | 52 |
| Comparative Example 11 | 68 | 129 | 212 | 405 | 49 | 42 | Δ | 67 |

| Formulation | |
|---|---|
| Selectively partially hydrogenated polymer (Example 5–8, Comparative Example 4–5) or starting polymer (Comparative Example 6) | 100 wt. parts |
| Oil (aromatic oil) | 37.5 wt. parts |
| Carbon (N-339) | 68.75 wt. parts |
| Stearic acid | 1 wt. parts |
| Zinc white | 3 wt. parts |
| Antioxidant (810N) | 1 wt. parts |
| Sulfur | 1.75 wt. parts |
| Accelerator NS | 1.38 wt. parts |

*7by JIS-K-6301, JIS-A hardness tester.
*8, *9, *10according to the tensile test method of JIS-K-6301
*11resilience: Rupke method according to JIS-K-6301, but resilience at 70° C. is measured by pre-heating the sample in an oven at 70° C. for one hour and quickly then removing same.
*12Goodrich heat buildup: using a Goodrich flexometer, the test is conducted under the conditions of a load of 24 pounds, a displacement of 0.225 inch, a starting temperature of 50° C. and a rotational number of 1800 rpm, and the elevated temperature difference after 20 minutes obtained.
*13overall evaluation of retentivity of hardness, tensile strength and elongation after 100 hrs in an oven at 100° C. The evaluation standards are as follows.
⊚: excellent,
○: good,
Δ: inferior,
X: bad.
*14wet skid resistance: using a portable skid tester produced by Stanley-London, and a safety walk (produced by 3M) as the road surface, measurements are conducted according to the method of ASTM-E-808-74.

EXAMPLES 9 AND 10 AND COMPARATIVE EXAMPLE 12

The mass polymerization is carried out using, as a toughening agent, the polymers obtained in Examples 1 and 2 and Comparative Example 3 as shown below. A 6 parts by weight amount of the partially hydrogenated butadiene rubber is dissolved in 94 parts by weight of styrene and 8 parts by weight of ethylbenzene. Furthermore, 0.05 parts by weight of benzoyl peroxide and 0.10 parts by weight of α-methylstyrene dimer are added and the polymerization is carried out while stirring at 80° C. for 4 hours, 110° C. for 4 hours, and 150° C. for 4 hours. Furthermore, a thermal treatment is carried out at about 230° C. for 30 minutes. Thereafter, unreacted styrene and ethylbenzene are removed in vacuo to obtain styrene resin, and the resultant styrene resin is crushed and extruded from an extruder to obtain the pellets. The physical properties are determined after the injection molding. The results are shown in Table 4.

As is clear from the results shown in Table 4, the impact resistant polystyrene resin according to the present invention has an excellent impact strength and flexural modulus.

TABLE 4

| No. | Example 9 | Example 10 | Comparative Example 12 |
|---|---|---|---|
| Partially hydrogenated polymer used | Example 1 | Example 2 | Comparative Example 3 |
| Izod impact strength*19 (notched kg.cm/cm 23° C.) | 9.2 | 9.0 | 6.3 |

TABLE 4-continued

| No. | Example 9 | Example 10 | Comparative Example 12 |
|---|---|---|---|
| Flexural modulus[20] | 23200 | 23600 | 22000 |

[19]According to JIS-K-7110 (notched) (kg.cm/cm)
[20]According to ASTM D-790 (kg/cm$^2$)

EXAMPLES 11-18 AND COMPARATIVE EXAMPLES 13-15

Using an autoclave having a 10 liters inner volume and equipped with a stirrer and a jacket as the reactor, a butadiene/n-hexane mixture (butadiene concentration 20% by weight containing 100 PPm tetramethyl ethylene diamine) is introduced at a rate of 20 liters/hr and an n-butyllithium/n-hexane solution (concentration 5% by weight) at a rate of 70 ml/hr, and a continuous polymerization of the butadiene is carried out at a polymerization temperature of 110° C. The active polymer obtained is deactivated with methanol, and 8 liters of the polymer solution is transferred into another reactor having a 10 liters inner volume and equipped with a stirrer and a jacket At a temperature of 60° C., a mixture of 250 ml of di-p-tolylbis(1-cyclopentadietnyl(titanium/cyclohexane solution (concentration 1 mmol/liter) and 50 ml of n-butyllithium solution (concentration 5 mmol/liter) mixed at 0° C. under a hydrogen pressure of 2.0 kg/cm$^2$ is added, and the reaction is carried out under a partial hydrogen pressure of 3.0 kg/cm$^2$ for 30 minutes. The partially hydrogenated polymer solution obtained is added with 0.5 parts by weight of 2,6-di-tert-butylhydroxytoluene as the antioxidant, followed by removal of the solvent. The analytical values of the starting polymer A obtained by sampling after methanol deactivation and the analytical values of the partially hydrogenated polymer D are shown in Table 5.

The butadiene polymers obtained in the same way as the Polymer A are hydrogenated by varying the hydrogenation reaction conditions (hydrogenation pressure, hydrogenation temperature, time and catalyst amount) to obtain partially hydrogenated polymers B, C, and E to K. The structural analytical values of these polymers are also shown in Table 5.

Thereafter, the impact resistant styrene resins are prepared by using the above-prepared polymer in the same manner as in Example 9. The physical properties are also determined in the same manner.

The results are shown in Table 6. As is clear from the results shown in. Table 6, the impact resistant polystyrene resins according to the present invention have an excellent impact strength and flexural modulus.

EXAMPLES 19-24 AND COMPARATIVE EXAMPLES 16-18

As for polymers A and D, but using an organic lithium catalyst modified with tetrahydrofuran as the catalyst, a polymer L is obtained. This polymer is hydrogenated under various hydrogenation reaction conditions to obtain partially hydrogenated polymers M - T. The analytical values of the polymers obtained are shown in Table 7.

Subsequently, the polymers obtained as described above are formulated in an amount of 7 parts by weight as the toughening agent according to the same method as in Example 11, to obtain high impact styrenic resins, the physical properties of which are measured. The results are shown in Table 8.

As can be seen from Table 8, the impact resistant styrenic resins using the partially hydrogenated polybutadiene within the scope of the present invention have a higher impact strength, and a higher flexural modulus, compared with the resins of Comparative Examples.

EXAMPLES 25-30 AND COMPARATIVE EXAMPLES 19, 20

Instead of the continuous polymerization process, polybutadiene rubber is obtained by the batch polymerization process. Namely, an autoclave having a 10 liters inner volume and equipped with a stirrer and a jacket is washed and dried, and after replacement with nitrogen, 100 parts by weight of previously purified and dried 1,3-butadiene and 700 parts by weight of n-hexane, then 3.2 parts by weight of 5% by weight of n-hexane solution of n-butyllithium and 0.2 part by weight of tetrahydrofuran, as the vinyl controlling agent are added, followed by initiation of the polymerization at 70° C. The polymerization temperature is raised to 100° C. After 30 minutes, 0.06 part by weight of silicon tetrachloride is added to the polymer solution and the reaction is carried out for 30 minutes to obtain a polybutadiene rubber solution.

EXAMPLES 31-39

As in Example 21, but adding 0.6 part by weight of an epoxidized polybutadiene (epoxy addition ratio: 8 mol/mon) in place of silicon tetrachloride, the reaction is carried out for 30 minutes to obtain a polybutadiene rubber solution.

A part of the rubber solution is hydrogenated in the same manner as in Example 11, and according to the same method as in Example 11, an unhydrogenated polybutadiene rubber (U) and partially hydrogenated polybutadiene rubbers (V - BB) are obtained.

The characteristics of the rubbers obtained are shown in Table 9.

Subsequently, using 9 parts by weight of each of the polybutadiene rubber U - BB obtained above, impact resistant styrenic resins are obtained according to the same method as in Example 11, and the physical properties thereof are measured to obtain the results shown in Table 10.

As is apparent from Table 10, the impact resistant styrenic resins using the partially hydrogenated polybutadiene within the scope of the present invention have a higher impact strength and a higher flexural modulus, compared with the resins of Comparative examples.

A part of the rubber solution is hydrogenated in the same manner as in Example 11, and according to the same method as in Example 11, an unhydrogenated polybutadiene rubber (CC) and partially hydrogenated polybutadiene rubbers (DD - II) are obtained.

The characteristics of the rubbers obtained are shown in Table 11.

Subsequently, using 9 parts by weight of each of the polybutadiene rubbers CC - II obtained above, impact resistant styrenic resins are obtained according to the same method as in Example 11, and the physical properties thereof are measured to obtain the results shown in Table 12.

As is apparent from Table 12, the impact resistant styrenic resins using the partially hydrogenated polybutadiene within the scope of the present invention have a higher impact strength and a higher flexural modulus.

EXAMPLES 40, 41 AND COMPARATIVE EXAMPLES 21

An example of a 50:50 blend of the impact resistant styrenic resin of the present invention and a polyphenylene ether poly(2,6-dimethyl-1,4-phenyl)ether (PPE), polymerization degree 140 is shown The PPE is obtained by blowing oxygen into a mixed solution of 2,6-dimethylphenol, cupric bromide, di-n-butylamine, and toluene. The results are shown in Table 13.

It can be appreciated that the impact resistant styrenic resin of the present invention also has an excellent impact resistance when blended with PPE.

TABLE 5

| Polybutadiene rubber | Vinyl content[*2] V (wt %) | Weight average molecular weight[*3] (Mw × $10^4$) | Molecular weight distribution[*4] (Mw/Mn) | Total hydrogenation % (A) of butadiene portion[*5] | Hydrogenation % of Vinyl linkage portion (B)[*6] | Vinyl linkage content (%) after hydrogenation[*15] | 1,4-linkage content after hydrogenation (%)[*16] | [*17] ML$_{1+4}^{100°C.}$ (%) | [*18] 5% SV$_{cps}^{(25°C.)}$ |
|---|---|---|---|---|---|---|---|---|---|
| A (Unhydrogenated polybutadiene) | 15 | 21 | 2.0 | 0 | 0 | 15 | 85 | 32 | 65 |
| B (Partially hydrogenated polybutadiene) | 15 | 21 | 2.0 | 3 | 13 | 13 | 84 | 32 | 65 |
| C (Partially hydrogenated polybutadiene) | 15 | 21 | 2.0 | 5 | 20 | 12 | 83 | 32 | 65 |
| D (Partially hydrogenated polybutadiene) | 15 | 21 | 2.0 | 9 | 40 | 9 | 82 | 32 | 66 |
| E (Partially hydrogenated polybutadiene) | 15 | 21 | 2.0 | 19 | 67 | 5 | 76 | 33 | 66 |
| F (Partially hydrogenated polybutadiene) | 15 | 21 | 2.0 | 25 | 87 | 2 | 73 | 34 | 69 |
| G (Partially hydrogenated polybutadiene) | 15 | 21 | 2.0 | 30 | 93 | 1 | 69 | 35 | 70 |
| H (Partially hydrogenated polybutadiene) | 15 | 21 | 2.0 | 37 | 97 | 0.5 | 62.5 | 39 | 75 |
| I (Partially hydrogenated polybutadiene) | 15 | 21 | 2.0 | 45 | 100 | 0 | 55 | 43 | 71 |
| J (Partially hydrogenated polybutadiene) | 15 | 21 | 2.0 | 79 | 100 | 0 | 21 | 41 | 82 |
| K (Partially hydrogenated polybutadiene) | 15 | 21 | 2.0 | 90 | 100 | 0 | 10 | 37 | Difficulty soluble in styrene |

[*15]measured by NMR (see[*2]).
[*16]1,2-vinyl content after hydrogenation [V] × [B]/100(%) 1,4-linkage content after hydrogenation (100 − [V]) × [C]/100 (%)
[*17]after heating at 100° C. for one minute and driving for 4 minutes, the torque reading is obtained by using an L-rotor.
[*18]measured by Canon-Fenske type viscometer; unit in centipoise.

TABLE 6

| | Impact resistant styrenic resin | Example 11 | Example 12 | Example 13 | Example 14 | Example 15 | Example 16 | Comparative Example 13 | Example 17 | Example 18 | Comparative Example 14 | Comparative Example 15 |
|---|---|---|---|---|---|---|---|---|---|---|---|---|
| Preparation | Rubber used as toughening agent | C | D | E | F | G | H | B | I | J | K | A |
| | Rubber (wt. parts) | 6 | 6 | 6 | 6 | 6 | 6 | 6 | 6 | 6 | 6 | 6 |
| | Styrene (wt. parts) | 94 | 94 | 94 | 94 | 94 | 94 | 94 | 94 | 94 | 94 | 94 |
| | Toluene (wt. parts) | 10 | 10 | 10 | 10 | 10 | 10 | 10 | 10 | 10 | 10 | 10 |
| Characteristics | Izod impact strength[*19] (notched kg.cm/cm 23° C.) | 7.2 | 8.0 | 8.9 | 8.8 | 8.2 | 7.5 | 6.0 | 5.4 | 5.1 | 3.5 | 5.6 |
| | Flexural modulus[*20] (kg/cm$^2$) | 23000 | 23200 | 23400 | 23500 | 23000 | 23100 | 22000 | 22300 | 22100 | 21800 | 21900 |

TABLE 7

| Polybutadiene rubber | Vinyl content[*2] [V] (wt %) | Weight average molecular weight[*3] (Mw × $10^4$) | Molecular weight distribution[*4] (Mw/Mn) | Total hydrogenation % (A) of butadiene portion[*5] | Hydrogenation % of Vinyl linkage portion (B)[*6] | Vinyl linkage content (%) after hydrogenation[*15] | 1,4-linkage content after hydrogenation (%)[*16] | [*17] ML$_{1+4}^{100°C.}$ (%) | [*18] 5% SV$_{cps}^{(25°C.)}$ |
|---|---|---|---|---|---|---|---|---|---|
| L (Unhydrogenated | 39 | 24 | 2.1 | 0 | 0 | 39 | 61 | 39 | 90 |

TABLE 7-continued

| Polybutadiene rubber | Vinyl content[2] [V] (wt %) | Weight average molecular weight[3] (Mw × 10⁴) | Molecular weight distribution[4] (Mw/Mn) | Total hydrogenation % (A) of butadiene portion[5] | Hydrogenation % of Vinyl linkage portion (B)[6] | Vinyl linkage content (%) after hydrogenation[15] (%) | 1,4-linkage content after hydrogenation (%)[16] | [17] ML$_{1+4}^{100°C.}$ (%) | [18] 5% SV$_{cps}^{(25°C.)}$ |
|---|---|---|---|---|---|---|---|---|---|
| polybutadiene) | | | | | | | | | |
| M (Partially hydrogenated polybutadiene) | 39 | 24 | 2.1 | 7 | 13 | 34 | 59 | 39 | 90 |
| N (Partially hydrogenated polybutadiene) | 39 | 24 | 2.1 | 33 | 67 | 13 | 54 | 35 | 85 |
| O (Partially hydrogenated polybutadiene) | 39 | 24 | 2.1 | 36 | 72 | 11 | 53 | 37 | 87 |
| P (Partially hydrogenated polybutadiene) | 39 | 24 | 2.1 | 40 | 80 | 8 | 52 | 36 | 87 |
| Q (Partially hydrogenated polybutadiene) | 39 | 24 | 2.1 | 49 | 92 | 3 | 48 | 44 | 92 |
| R (Partially hydrogenated polybutadiene) | 39 | 24 | 2.1 | 60 | 97 | 1 | 39 | 57 | 100 |
| S (Partially hydrogenated polybutadiene) | 39 | 24 | 2.1 | 75 | 100 | 0 | 25 | 66 | 123 |
| T (Partially hydrogenated polybutadiene) | 39 | 24 | 2.1 | 92 | 100 | 0 | 8 | 62 | Difficulty soluble in styrene |

TABLE 8

| | Impact resistant styrenic resin | Example 19 | Example 20 | Example 21 | Example 22 | Comparative Example 16 | Example 23 | Example 24 | Comparative Example 17 | Comparative Example 18 |
|---|---|---|---|---|---|---|---|---|---|---|
| Preparation | Rubber used as toughening agent | O | P | Q | R | M | N | S | T | L |
| | Rubber (wt. parts) | 7 | 7 | 7 | 7 | 7 | 7 | 7 | 7 | 7 |
| | Styrene (wt. parts) | 93 | 93 | 93 | 93 | 93 | 93 | 93 | 93 | 93 |
| | Toluene (wt. parts) | 10 | 10 | 10 | 10 | 10 | 10 | 10 | 10 | 10 |
| Characteristics | Izod impact strength[19] (notched kg.cm/cm 23° C.) | 8.5 | 9.2 | 10.3 | 9.4 | 5.9 | 7.1 | 5.0 | 3.2 | 5.4 |
| | Flexural modulus[20] (kg/cm²) | 21700 | 21800 | 22000 | 22100 | 19800 | 20000 | 19900 | 19500 | 19700 |

TABLE 9

| Polybutadiene rubber | Vinyl content[2] V (wt %) | Weight average molecular weight[3] (Mw × 10⁴) | Molecular weight distribution[4] (Mw/Mn) | Total hydrogenation % (A) of butadiene portion[5] | Hydrogenation % of vinyl linkage portion (B)[6] | Vinyl linkage content (%) after hydrogenation[15] (%) | 1,4-linkage content after hydrogenation (%)[16] | [17] ML$_{1+4}^{100°C.}$ (%) | [18] 5% SV$_{cps}^{25°C.}$ |
|---|---|---|---|---|---|---|---|---|---|
| U (Unhydrogenated polybutadiene) | 53 | 18 | 1.8 | 0 | 0 | 53 | 47 | 52 | 36 |
| V (Partially hydrogenated polybutadiene) | 53 | 18 | 1.8 | 45 | 72 | 15 | 40 | 43 | 27 |
| W (Partially hydrogenated polybutadiene) | 53 | 18 | 1.8 | 49 | 77 | 12 | 39 | 43 | 28 |
| X (Partially hydrogenated polybutadiene) | 53 | 18 | 1.8 | 57 | 87 | 7 | 36 | 45 | 29 |
| Y (Partially hydrogenated polybutadiene) | 53 | 18 | 1.8 | 62 | 92 | 4 | 34 | 47 | 33 |
| Z (Partially hydrogenated polybutadiene) | 53 | 18 | 1.8 | 78 | 98 | 1 | 21 | 57 | 46 |
| AA (Partially hydrogenated polybutadiene) | 53 | 18 | 1.8 | 83 | 99 | 0.7 | 16.3 | 62 | 51 |
| BB (Partially | 53 | 18 | 1.8 | 90 | 99 | 0.5 | 9.5 | 68 | Difficulty |

TABLE 9-continued

| Polybutadiene rubber | Vinyl content*2 V (wt %) | Weight average molecular weight*3 (Mw × 10⁴) | Molecular weight distribution*4 (Mw/Mn) | Total hydrogenation % (A) of butadiene portion*5 | Hydrogenation % of vinyl linkage portion (B)*6 | Vinyl linkage content (%) after hydrogenation*15 (%) | 1,4-linkage content after hydrogenation (%)*16 | *17 ML$_{1+4}^{100°C.}$ | *18 5% SV$_{cps}^{(25°C.)}$ |
|---|---|---|---|---|---|---|---|---|---|
| hydrogenated polybutadiene) | | | | | | | | | soluble in styrene |

TABLE 10

| Impact resistant styrenic resin | | Example 25 | Example 26 | Example 27 | Example 28 | Example 29 | Example 30 | Comparative Example 19 | Comparative Example 20 |
|---|---|---|---|---|---|---|---|---|---|
| Preparation | Rubber used as toughening agent | W | X | Y | Z | AA | V | BB | U |
| | Rubber (wt. parts) | 9 | 9 | 9 | 9 | 9 | 9 | 9 | 9 |
| | Styrene (wt. parts) | 91 | 91 | 91 | 91 | 91 | 91 | 91 | 91 |
| | Toluene (wt. parts) | 10 | 10 | 10 | 10 | 10 | 10 | 10 | 10 |
| Characteristics | Izod impact strength*19 (notched kg.cm/cm 23° C.) | 10.5 | 11.2 | 12.3 | 11.4 | 10.7 | 9.0 | 5.2 | 6.4 |
| | Flexural modulus*20 (kg/cm²) | 19700 | 19800 | 20000 | 20100 | 20000 | 18700 | 18200 | 18400 |

TABLE 11

| Polybutadiene rubber | Vinyl content*2 [V] (wt %) | Weight average molecular weight*3 (Mw × 10⁴) | Molecular weight distribution*4 (Mw/Mn) | Total hydrogenation % (A) of butadiene portion*5 | Hydrogenation % of vinyl linkage portion (B)*6 | Vinyl linkage content (%) after hydrogenation*15 (%) | 1,4-linkage content after hydrogenation (%)*16 | *17 ML$_{1+4}^{100°C.}$ (%) | *18 5% SV$_{cps}^{(25°C.)}$ |
|---|---|---|---|---|---|---|---|---|---|
| CC (Unhydrogenated polybutadiene) | 19 | 20 | 1.6 | 28 | 0 | 33 0 | 19 | 81 | 67 | 61 |
| DD (Partially hydrogenated polybutadiene) | 19 | 20 | 1.6 | 10 | 26 | 14 | 76 | 64 | 59 |
| EE (Partially hydrogenated polybutadiene) | 19 | 20 | 1.6 | 16 | 47 | 10 | 74 | 62 | 58 |
| FF (Partially hydrogenated polybutadiene) | 19 | 20 | 1.6 | 23 | 68 | 6 | 71 | 61 | 57 |
| GG (Partially hydrogenated polybutadiene) | 19 | 20 | 1.6 | 28 | 84 | 3 | 69 | 60 | 57 |
| HH (Partially hydrogenated polybutadiene) | 19 | 20 | 1.6 | 35 | 95 | 1 | 64 | 60 | 56 |
| II (Partially hydrogenated polybutadiene) | 19 | 20 | 1.6 | 60 | 100 | 0 | 30 | 77 | 72 |

TABLE 12

| Impact resistant styrenic resin | | Example 31 | Example 32 | Example 33 | Example 34 | Example 35 | Example 36 | Example 37 | Example 38 | Example 39 |
|---|---|---|---|---|---|---|---|---|---|---|
| Preparation | Rubber used as toughening agent | EE | FF | GG | HH | FF | DD | II | CC | CC |
| | Rubber (wt. parts) | 8 | 8 | 8 | 8 | 12 | 8 | 8 | 8 | 12 |
| | Styrene (wt. parts) | 92 | 92 | 92 | 92 | 66 | 92 | 92 | 92 | 66 |
| | Acrylonitrile (wt. parts) | 0 | 0 | 0 | 0 | 22 | 0 | 0 | 0 | 22 |
| | Toluene (wt. parts) | 10 | 10 | 10 | 10 | 30 | 10 | 10 | 10 | 30 |
| Characteristics | Izod impact strength*19 (notched kg.cm/cm 23° C.) | 10.5 | 11.6 | 11.8 | 10.7 | 23.0 | 9.1 | 8.7 | 7.3 | 17.5 |
| | Flexural modulus*20 (kg/cm²) | 21800 | 21900 | 22000 | 22300 | 30000 | 20300 | 20600 | 20200 | 27400 |

TABLE 13

|  | Example 40 | Example 41 | Comparative Example 21 |
|---|---|---|---|
| Impact resistant styrenic resin used | Resin of Example 13 | Resin of Example 14 | Resin of Comparative Example 17 |
| Izod impact*19 strength (kg.cm/cm, notched 23° C.) | 12.2 | 12.7 | 8.9 |

What is claimed is:

1. A selectively partially hydrogenated butadiene polymer produced by selectively, partially hydrogenating a butadiene polymer comprising:
   (1) a bound styrene content [S] of 0 to 40% by weight;
   (2) a vinyl linkage content [V] of 1 to 80% at the butadiene portion;
   (3) a weight average molecular weight (Mw) of 10,000 to 1,000,000; and
   (4) a molecular weight distribution (Mw/Mn) of 1.2 to 5.0;
   wherein the selectively, partially hydrogenated butadiene polymer produced is characterized
   (5) a hydrogenation ratio [A] of 3 to 85% of the total butadiene portion; and
   (6) a hydrogenation ratio [B] of 20% or more at the vinyl linkage moiety of the butadiene portion;
   said [A], [B], [S] and [V] satisfying the relationships of:
   (7) $[A]/([S]+[V])^{\frac{1}{2}}$ which is 2 to 8; and
   (8) $[B].[V]^{\frac{1}{2}}/[A]$ which is 10 to 16.

2. The selectively partially hydrogenated butdiene polymer as claimed in claim 1, wherein the hydrogenated ratio [A] is 3 to 60% and the hydrogenation ratio [B] is of 30% or more.

3. The selectively, partially hydrogenated butadiene polymer as claimed in claim 1, wherein the butadiene polymer being partially hydrogenated comprises:
   (1) a bound styrene content [S] of 0 to 30% by weight;
   (2) a vinyl linkage content [V] of 5 to 60% by weight at the butadiene portion;
   (3) a weight average molecular weight (Mw) of 50,000 to 800,000; and
   (4) a molecular weight distribution (Mw/Mn) of 1.5 to 3.0.

4. The selectively, partially hydrogenated butadiene polymer as claimed in claim 1, wherein the butadiene polymer being hydrogenated is a butadiene homopolymer.

5. The selectively, partially hydrogenated butadiene polymer as claimed in claim 1, wherein the butadiene polymer being hydrogenated is a styrenebutadiene copolymer having a styrene content of 30% by weight or less, said styrene being bound at random.

6. A rubber composition suitable for use in tire manufacture comprising 100 parts by weight of a starting material rubber containing at least 30% by weight of the selectively partially hydrogenated butadiene polymer of claim 1, 10 to 150 parts by weight of carbon black, and 0.1 to 10 parts of a vulcanizing agent.

7. The rubber composition as claimed in claim 6, wherein the hydrogenation ratio [A] of the selectively, partially hydrogenated butadiene polymer is 3 to 60% and hydrogenation ratio [B] of the selectively, partially hydrogenated butadiene polymer is 30% or more.

8. The rubber composition as claimed in claim 6, wherein the butadiene polymer being partially hydrogenated comprises:
   (1) a bound styrene content [S] of 0 to 30% by weight;
   (2) a vinyl linkage content [V] of 5 to 60% at the butadiene portion;
   (3) a weight average molecular weight (Mw) of 50,000 to 800,000; and
   (4) a molecular weight distribution (Mw/Mn) of 1.5 to 3.0.

9. An impact resistant styrenic resin comprising a toughening agent, which comprises 2% to 25% by weight of the selectively, partially hydrogenated butadiene polymer of claim 1 wherein the butadiene polymer being partially hydrogenated comprises:
   (1) a bound styrene content [S] of 0 to 30% by weight;
   (2) a vinyl linkage content [V] of 5 to 60% at the butadiene portion;
   (3) a weight average molecular weight (Mw) of 50,000 to 800,000;
   (4) a molecular weight distribution (Mw/Mn) of 1.2 to 5.0,
   wherein the selectively, partially hydrogenated butadiene polymer produced is characterized by
   (5) a hydrogenation ratio [A] of 3 to 85% of the total butadiene portion; and
   (6) a hydrogenation ratio [B] of 20% or more at the vinyl linkage moiety of the butadiene portion.

10. The impact resistant styrenic resin as claimed in claim 9, wherein after the selective, partial hydrogenation, the 1,2-vinyl linkage content of [V] is 0.5 to 12% and the 1,4-linkage content of [V] is at least 10%.

11. The impact resistant styrenic resin as claimed in claim 9, wherein the butadiene polymer being partially hydrogenated comprises:
   (1) a bound styrene content [S] of 0 to 30% by weight;
   (2) a vinyl linkage content [V] of 5 to 60% at the butadiene portion;
   (3) a weight average molecular weight (Mw) of 50,000 to 800,000; and
   (4) a molecular weight distribution (Mw/Mn) of 1.5 to 3.0.

12. The impact resistant styrenic resin as claimed in claim 9, wherein the hydrogenation ratio [A] is 3 to 60%; and the hydrogenation ratio [B] is 30% or more.

13. The impact resistant styrenic resin as claimed in claim 9, wherein the butadiene being hydrogenated is a butadiene homopolymer.

14. The impact resistant styrenic resin as claimed in claim 9, wherein the butadiene polymer being hydrogenated is a styrene-butadiene copolymer having a styrene content of 30% by weight or less.

15. A method for producing an impact resistant styrenic resin, which comprises radically polymerizing, by mass polymerization, suspension polymerization or solution polymerization, 2 to 25 parts by weight of a selectively partially hydrogenated butadiene polymer of claim 1, wherein after the selective, partial hydrogenation the 1,2-vinyl linkage content of [V] is 0.5 to 12%, and the 1,4-linkage content of [V] is at least 10% with 98 to 75 parts by weight of a styrene monomer or a mixture of a styrene monomer and a monomer copolymerizable with the styrene monomer, wherein said selectively, partially hydrogenated butadiene polymer comprises:

(1) a bound styrene content [S] of 0 to 40% by weight;
(2) a vinyl linkage content [V] of 1 to 80% at the butadiene portion;
(3) a weight average molecular weight (Mw) of 10,000 to 1,000,000; and
(4) a molecular weight distribution (Mw/Mn) of 1.2 to 5.0;

said butadiene polymer having:
(5) a hydrogenation ratio [A] of 3 to 85% of the total butadiene portion; and
(6) a hydrogenation ratio [B] of 20% or more at the vinyl linkage moiety of the butadiene portion.

* * * * *